(12) United States Patent
Kronenberg

(10) Patent No.: US 6,486,633 B1
(45) Date of Patent: Nov. 26, 2002

(54) METHOD FOR MONITORING THE SPEED OF A SYNCHRONOUS MOTOR, AND A DEVICE FOR MONITORING THE SPEED OF SUCH A MOTOR

(75) Inventor: Klaus Kronenberg, Sulzbach (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/470,187

(22) Filed: Dec. 22, 1999

(30) Foreign Application Priority Data

Dec. 23, 1998 (DE) ......................... 198 60 110

(51) Int. Cl.[7] ................................ H02P 5/28
(52) U.S. Cl. ................. 318/700; 318/138; 318/254; 318/439; 318/490; 318/565; 318/720; 318/721; 318/722; 318/723; 318/724; 318/909
(58) Field of Search ................... 318/138, 254, 318/439, 490, 565, 700, 720–724, 909

(56) References Cited

U.S. PATENT DOCUMENTS

| 4,449,086 A | * | 5/1984 | Hoffman et al. | 318/696 |
|---|---|---|---|---|
| 5,298,840 A | * | 3/1994 | Yoshino et al. | 318/268 |
| 5,349,276 A | * | 9/1994 | Mezzatesta et al. | 318/268 |
| 5,378,976 A | * | 1/1995 | Inaji et al. | 318/810 |
| 5,434,492 A | * | 7/1995 | Hilaire et al. | 318/717 |
| 5,442,273 A | * | 8/1995 | Ikawa et al. | 318/799 |
| 5,627,447 A | * | 5/1997 | Unsworth et al. | 318/801 |
| 5,744,921 A | * | 4/1998 | Makaran | 318/254 |
| 5,866,498 A | * | 2/1999 | Menegoli | 318/254 |
| 5,929,577 A | * | 7/1999 | Neidorff et al. | 318/254 |
| 6,128,436 A | * | 10/2000 | Bos et al. | 388/815 |

FOREIGN PATENT DOCUMENTS

| DE | 3609826 | 9/1987 |
|---|---|---|
| DE | 4120100 | 1/1992 |
| DE | 4039886 | 6/1992 |

* cited by examiner

*Primary Examiner*—Robert E. Nappi
*Assistant Examiner*—Tyrone Smith
(74) *Attorney, Agent, or Firm*—Martin A. Farber

(57) ABSTRACT

A method for monitoring the speed of a synchronous motor, the synchronous motor having a permanent magnet rotor (3) and coils (1, 2), sinusoidal currents being applied to the coils (1, 2). Also a device for monitoring the speed of such a motor, wherein in at least one of the coils (1, 2) the power supply is disconnected and one or more voltage characteristics (U1, U2) are evaluated which are induced by the permanent magnet rotor (3) in one or more of the coils (1, 2) disconnected from the power supply, the minimum duration of the interruption of the power supply of the coils (1, 2) and the evaluation of the voltage characteristic (U1, U2) being equal to the temporal spacing between two consecutive zero crossings of the respectively induced voltage characteristics (U1, U2).

12 Claims, 3 Drawing Sheets

METHOD FOR MONITORING THE SPEED OF A SYNCHRONOUS MOTOR, AND A DEVICE FOR MONITORING THE SPEED OF SUCH A MOTOR

FIELD AND BACKGROUND OF THE INVENTION

The invention relates to a method for monitoring the speed of a synchronous motor, the synchronous motor having a permanent magnet rotor and coils, sinusoidal currents being applied to the coils, and to a device for monitoring the speed of such a motor.

In synchronous motors, the coils to which current is applied generate rotating magnetic fields which set the permanent magnet rotor rotating, the speeds of the magnetic field and rotor being the same. Known for the purpose of monitoring the speed of the rotor are sensors which detect the position of the rotor magnetically or optically. The sensors require additional installation space and necessitate overall a higher outlay on producing the motor.

SUMMARY OF THE INVENTION

It is therefore the object of the invention to specify a method for monitoring the speed in which it is possible to dispense with additional installation space and a higher outlay on producing the motor. An appropriate device is also to be specified.

These objects are achieved, on the one hand, by a method in which in the case of at least one of the coils the power supply is disconnected and a voltage characteristic is evaluated which is induced by the rotor in the coil or in one or more of the coils and not supplied with power, the minimum duration of the disconnection of the power supply and the evaluation of the voltage characteristic being equal to the temporal spacing between two consecutive zero crossings of the voltage respectively induced by the rotor.

In a device according to the invention for monitoring the speed of a previously described synchronous motor, the power supply of at least one coil can be disconnected, and an evaluation circuit is present in which it is possible to determine the speed of the rotor by evaluating the voltage characteristics which are induced by the permanent magnet rotor in the coils disconnected from the power supply.

The evaluation method is particularly simple in form when the coils disconnected from the power supply are isolated from the power supply.

By virtue of the fact that in each case two consecutive measurements of the voltage characteristic in a coil, or time-offset measurements of the voltage characteristics in a plurality of coils are carried out during a power supply interruption, it is possible to determine the deceleration of the permanent magnet rotor which is not, or partially not being driven.

The speed and the position of the permanent magnet rotor can then be determined from this deceleration for a subsequent instant, with the result that the coils can once again be driven optimally at the correct frequency and with the correct phase angle of the current.

The device according to the invention can be provided in a particularly simple fashion when at least one changeover switch is present with the aid of which one or more coils can be isolated from the power supply unit and can be connected to the evaluation circuit.

BRIEF DESCRIPTION OF THE DRAWINGS

The invention is explained below in more detail with the aid of the figures for a particularly preferred exemplary embodiment. In the drawings.

DETAILED DESCRIPTION OF THE PREFERRED EMBODIMENT

Figure 1:
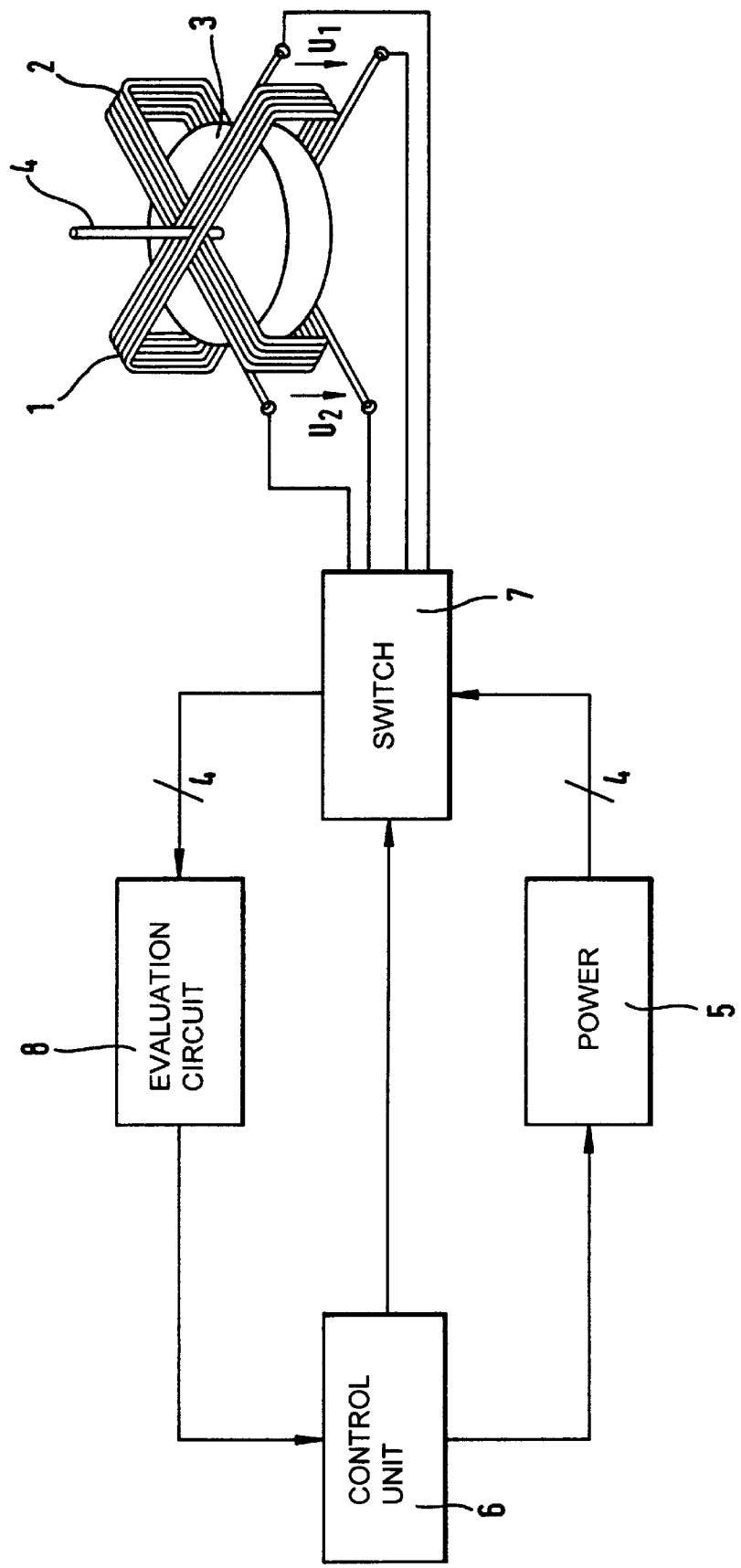
FIG. 1 shows a synchronous motor with an exemplary embodiment of a device according to the invention.

Coils 1, 2, a permanent magnet rotor 3 with a rotor shaft 4, a power supply unit 5, and a control unit 6 are represented in FIG. 1 as parts of a synchronous motor. Also represented in FIG. 1 are a particularly preferred changeover switch 7 and a particularly preferred evaluation circuit 8. The bearings required for the permanent magnet rotor 3 and rotor shaft 4 are not represented. The permanent magnet rotor 3 is diametrically magnetized. The power supply unit 5 supplies the coils 1, 2 with a sinusoidal current in each case via the changeover switch 7, the two currents being phase-shifted by 90°. Thus, a magnetic field is generated which also rotates at the frequency of the two currents about the axis of the permanent magnet rotor 3 and drives the permanent magnet rotor 3 in such a way that it has the same speed as the magnetic field when the torque exerted by the magnetic field on the permanent magnet rotor 3 is greater than the torques which oppose the rotation of the rotor 3 and act on the permanent magnet rotor 3, for example devices (not represented) which are driven via a rotor shaft 4 by the permanent magnet rotor 3, such as, for example, a gear unit or a fan impeller mounted on the rotor shaft 4.

Figure 2:
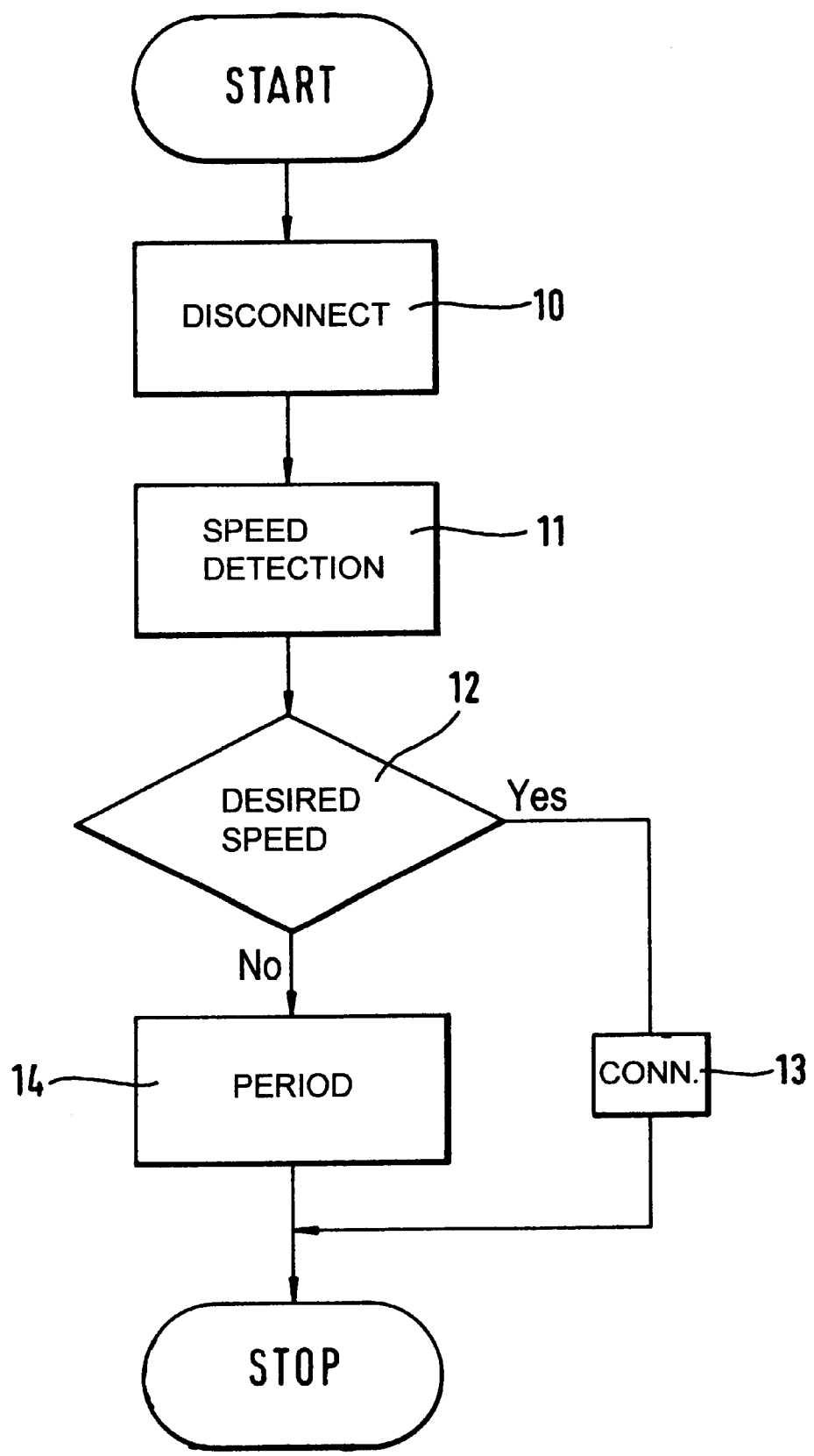
FIG. 2 shows an exemplary flow chart of the method according to the invention.
Figure 3:
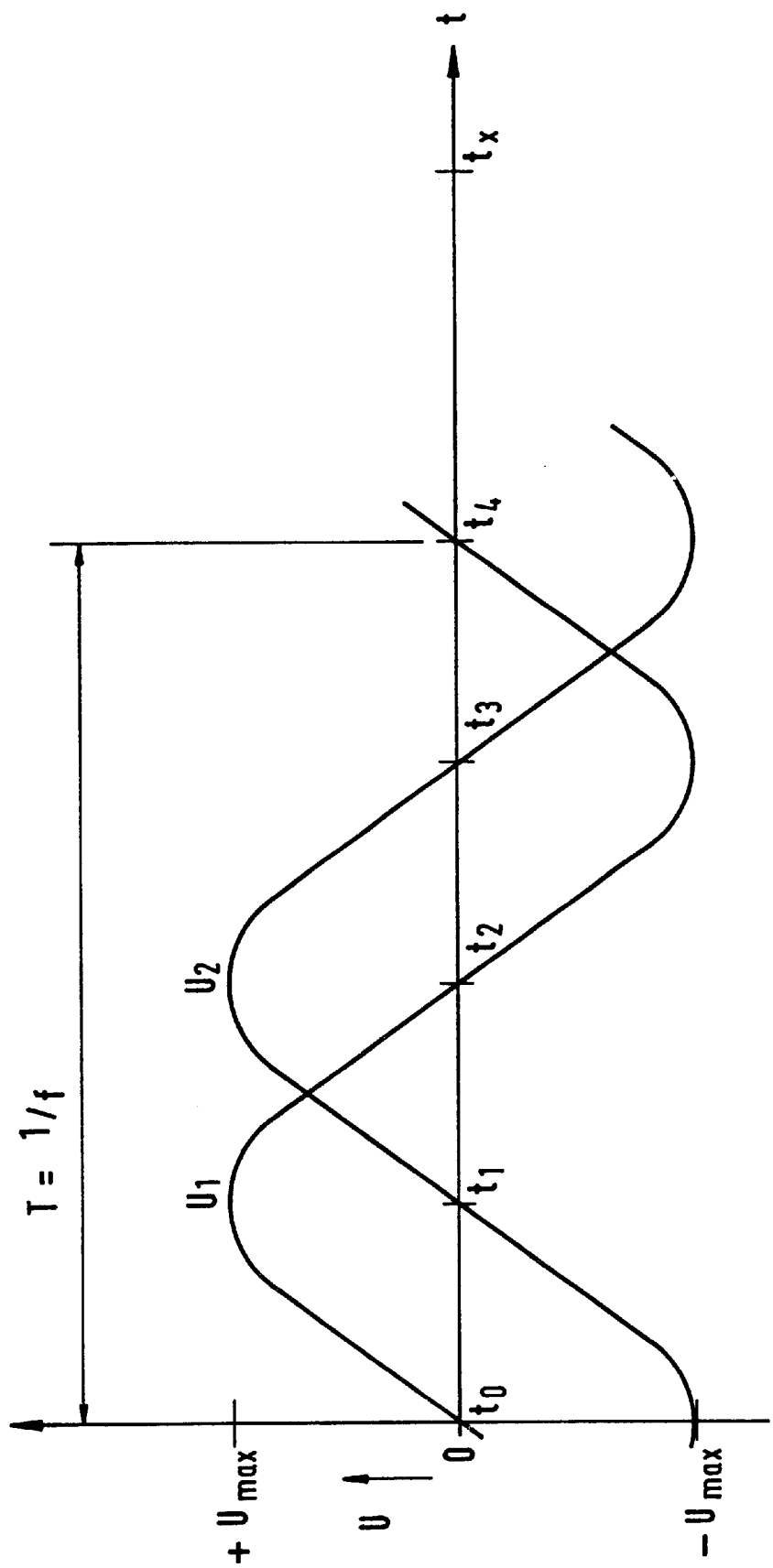
FIG. 3 shows a voltage characteristic which is generated by the permanent magnet motor in the coils of the synchronous motor of FIG. 1.

In FIG. 2, for the purpose of measuring the speed, in block 10 the coils 1, 2 are disconnected from the power supply unit 5 and connected to the evaluation circuit 8. Because of its inertia, the permanent magnet rotor 3 continues to rotate and through its rotation induces in the coils 1, 2 a voltage characteristic U1 and U2, respectively, whose variations are represented by way of example in FIG. 3. The voltage characteristics U1, U2 are represented for one revolution for a motor with a high moment of inertia, with the result that it is not possible to detect a deceleration optically during this one revolution by a gradually straightened shape of the curve. This speed is detected in block 11; for example, in the evaluation circuit 8 only the voltage characteristic U1 of the coil 1 is evaluated; firstly, the period from the first zero crossing at instant to up to the second zero crossing at $t_2$ is determined. The reciprocal of this time corresponds to twice the average speed of the permanent magnet rotor 3 between the instants $t_0$ and $t_2$. It is then determined in block 12 whether the average speed corresponds to the desired speed, and if yes the control unit 6 controls the changeover switch 7 such that the coils 1, 2 are reconnected at block 13 to the power supply unit 5. If no, in block 14 the evaluation circuit 8 determines the period from the second zero crossing at $t_2$ up to the third zero crossing at $t_4$. The reciprocal of this period corresponds to the average speed of the permanent magnet rotor 3 between the instants $t_2$ and $t_4$. The deceleration of the permanent magnet rotor 3, which is not being driven, can be determined from the decrease in the speed and the time difference between $t_0$ and $t_2$. It is then therefore possible to determine the position and rotational speed of the permanent magnet rotor 3 for a subsequent instant $t_x$, the instant $t_x$ being selected such that the complete calculation is terminated and that the coils 1, 2 can be driven via the power supply unit 1 and the changeover switch 7 with the aid in each case of a current of the correct frequency and phase angle. Thereafter, the motor can be controlled gradually up to the desired speed.

The period for determining the declaration can be shortened when the voltage characteristic U2 induced in coil 2 is additionally evaluated. Thus, for example, the voltage characteristic U1 of the coil 1 can be evaluated between the instants $t_0$ and $t_2$, and the can be determined, and the difference between the speeds and the time difference ($t_1$ minus $t_0$ in the case of the example) can be used to determine the declaration of the permanent magnet rotor 3 which is not being driven, with the result that it is already possible after the instant $t_3$ to determine the two average speeds.

The average speed of the rotor 3 can also be determined by determining the period required by a voltage characteristic U1 or U2 until for the first time it reaches from a first voltage value a second voltage value which has the same absolute value as the first voltage value but an opposite sign. Thus, it is possible to start determining the average speed at any instant, and thus further to shorten the time of the determination. Likewise, it is then possible to determine the declaration from two average speeds determined with a time offset, either only one of the voltage characteristics U1, U2 or both the voltage characterisitics U1, U2 being evaluated.

It is also possible to make use of a complete revolution of the rotor 3 for each measurement of the average speed, that is to say, for example, from the instants $t_0$ to $t_4$, or to use a multiple thereof. However, the measurement then lasts longer and can become more inaccurate.

I claim:

1. A method for monitoring the speed of a synchronous motor, the synchronous motor having a permanent magnet rotor and two coils to which sinusoidal currents are applied, and the angular distance of the sinusoidal currents from one another corresponding to the angular distance of the coils from one another, wherein in at least one of the coils the power supply is disconnected for an interval of time having a duration equal to at least one-half period of the sinusoidal currents, and wherein one or more voltage characteristics are evaluated based on a temporal spacing between two consecutive zero-crossings of a voltage induced by the permanent magnet rotor in one or more of the coils disconnected from the power supply, that minimum duration of the interruption of the power supply of the coils and the evaluation of the voltage characteristic being equal to the temporal spacing between two consecutive zero crossings of the respectively induced voltage characteristics.

2. The method as claimed in claim 1, wherein the coils (1, 2) disconnected from the power supply are isolated from the power supply.

3. The method as claimed in claim 1, wherein the deceleration of the permanent magnet rotor (3) which is not, or partially not being driven is determined from two measurements one after another in a coil (1, 2) or from time-offset measurements in one or more coils (1, 2).

4. The method as claimed in claim 3, wherein the position and speed of the permanent magnet rotor (3) is predetermined for a subsequent instant (tx) from the induced voltage characteristic (U1, U2) and the determined deceleration of the permanent magnet rotor (3).

5. The method as claimed in claim 4, characterized in that the application of current to the coils (1, 2) is matched to accord with the predetermined speed and position of the rotor (3).

6. A device for monitoring the speed of a synchronous motor which has a permanent magnet rotor and two coils which can be supplied with sinusoidal currents by a power supply unit, the device having a switch and an evaluation circuit, wherein the power supply of at least one of the coils can be disconnected by the switch for an interval of time having a duration equal to at least one-half period of the sinusoidal currents, it being possible to determine the speed of the permanent magnet rotor, in the evaluation circuit, by evaluating the voltage characteristics which are induced by the permanent magnet rotor in the coils disconnected from the power supply based on a temporal spacing between two consecutive zero-crossings of a voltage.

7. The device as claimed in claim 6, wherein said switch is a changeover switch (7) by means of which the coils (1, 2) disconnected from the power supply can be isolated from the power supply unit (5) and can be connected to the evaluation circuit (8).

8. The device as claimed in claim 6, wherein the deceleration of the permanent magnet rotor (3) can be determined with the aid of the evaluation circuit (8).

9. The device as claimed in claim 8, wherein the position and speed can be predetermined for a subsequent instant ($t_x$) with the aid of the evaluation circuit (8).

10. The device as claimed in claim 9, wherein the application of current to the coils (1, 2) can be matched to accord with the predetermined speed and position of the permanent magnet rotor (3).

11. A method for monitoring the speed of a synchronous motor, the synchronous motor having a permanent magnet rotor and two coils to which sinusoidal currents are applied, and the angular distance of the sinusoidal currents from one another being 90° and corresponding to the angular distance of the coils from one another, wherein in at least one of the coils the power supply is disconnected and one or more voltage characteristics are evaluated which are induced by the permanent magnet rotor in one or more of the coils disconnected from the power supply, that minimum duration of the interruption of the power supply of the coils and the evaluation of the voltage characteristic being equal to or greater than the temporal spacing between two consecutive zero crossings of the respectively induced voltage characteristics.

12. A device for monitoring the speed of a synchronous motor which has a permanent magnet rotor and two coils to be supplied with sinusoidal currents shifted in phase by 90° by a power supply unit, the device including circuitry for disconnecting power from at least one of the coils over an interval of time equal to or greater than a temporal spacing between two consecutive zero crossings of the voltage characteristics induced by the permanent magnet in the at least one coil, and an evaluation circuit serving to determine the speed of the permanent magnet by evaluating the voltage characteristics which are induced by the permanent magnet rotor in the at least one coil disconnected from the power supply.

* * * * *